United States Patent [19]

Kruyer

[11] 4,406,793
[45] Sep. 27, 1983

[54] USE OF FREE BODIES TO INCREASE SIZE OF DISPERSED PHASE PARTICLES

[76] Inventor: Jan Kruyer, 4643 82nd Ave., Edmonton, Alberta, Canada, T6B 2L9

[21] Appl. No.: 387,957

[22] Filed: Jun. 14, 1982

Related U.S. Application Data

[63] Continuation-in-part of Ser. No. 178,000, Aug. 14, 1980, abandoned.

[51] Int. Cl.³ .............................................. B01D 15/02
[52] U.S. Cl. .................................... 210/669; 210/691; 210/693; 210/267; 210/DIG. 5; 209/5; 209/49; 208/11 LE; 252/323; 252/360
[58] Field of Search .................. 209/5, 9–11, 209/49; 208/11 LE, 187, 188; 210/689, 693, 708, 924, DIG. 5, 691, 267, 669; 44/1 A; 252/322-325, 360, 362, 363; 264/117; 425/222

[56] References Cited

U.S. PATENT DOCUMENTS

| | | | |
|---|---|---|---|
| 1,585,755 | 5/1926 | Borcherdt | 209/5 X |
| 2,168,309 | 8/1939 | Alexander | 252/323 |
| 2,187,601 | 1/1940 | Glaxner | 425/222 X |
| 2,214,248 | 9/1940 | Hawley | 210/532.1 |
| 2,503,014 | 4/1950 | Webber | 252/325 |
| 2,711,557 | 6/1955 | Russell | 425/222 X |
| 2,755,502 | 7/1956 | Herr | 425/222 |
| 2,786,232 | 3/1957 | Larson | 425/222 X |
| 2,828,190 | 3/1958 | King | 425/222 X |
| 2,990,958 | 7/1961 | Greene | 209/166 |
| 3,072,255 | 1/1963 | Greene | 209/166 |
| 3,229,582 | 12/1965 | Iannicelli | 209/166 |
| 3,399,765 | 9/1968 | Puddington | 209/5 |
| 3,484,370 | 12/1969 | Simon | 252/325 |
| 3,617,548 | 11/1971 | Willihnganz | 252/325 |
| 3,665,060 | 5/1972 | Capes | 264/117 |
| 3,891,550 | 6/1975 | Gray | 208/11 R |
| 3,929,625 | 12/1975 | Lucas | 208/11 R |
| 3,984,287 | 10/1976 | Meadus | 208/11 LE |
| 4,033,729 | 7/1977 | Capes | 44/1 A |
| 4,133,742 | 1/1979 | Hill | 208/11 R |
| 4,200,517 | 4/1980 | Chalmers | 208/11 R |

FOREIGN PATENT DOCUMENTS

| | | | |
|---|---|---|---|
| 638886 | 3/1962 | Canada | 208/11 LE |
| 657876 | 2/1963 | Canada | 208/11 LE |
| 778347 | 2/1968 | Canada | 208/11 LE |
| 1934170 | 1/1971 | Fed. Rep. of Germany | 210/693 |
| 2300620 | 9/1976 | France | 209/5 |

OTHER PUBLICATIONS

"Agglomeration", Chemical Engineering, Dec. 4, 1967, p. 165.

*Primary Examiner*—Ralph J. Hill
*Attorney, Agent, or Firm*—Thorpe, North & Western

[57] ABSTRACT

A mixture containing a dispersed bitumen, oil or hydrocarbon phase and a continuous aqueous phase is passed for treatment through a rotating horizontal tumbler, containing oleophilic free bodies, for the purpose of increasing the particle size of the dispersed phase and facilitating subsequent separation of the phases of the mixture. Alternately, a mixture containing a dispersed aqueous phase and a continuous bitumen, oil or hydrocarbon phase is passed for treatment through a rotating horizontal tumbler, containing hydrophilic and oleophilic free bodies, for the purpose of increasing the particle size of the dispersed phase and facilitating subsequent separation of the phases of the mixture. The free bodies tumbling with the mixture in the drum have affinity for the dispersed phase particles and cause an increase in the particles' size of the dispersed phase of the mixture through a process of cyclic coalescence, agglutination, condensation and/or coherence of dispersed phase particles from the mixture onto the surface of the free bodies and cyclic shedding or sloughing off of coalesced dispersed phase back into the mixture. Some mixtures that may be treated include oil sand slurries, effluent streams from a hot sands extraction plant, oil-in-water emulsions from processes that use enhanced oil well recovery, and bitumen froth.

49 Claims, 9 Drawing Figures

USE OF FREE BODIES TO INCREASE SIZE OF DISPERSED PHASE PARTICLES

This application is a continuation-in-part of Ser. No. 178,000 filed Aug. 14, 1980, now abandoned.

BACKGROUND OF THE INVENTION

The present invention relates to a method for treating a mixture of continuous phase and dispersed phase so as to facilitate subsequent separation of the phases. The intent of the present invention is to increase the average size of dispersed phase particles in the mixture under treatment.

This invention is primarily concerned with recovering bitumen from mined oil sand and for recovering bitumen or oil phase from oil and water mixtures produced from oil wells. Extensive deposits of oil sands, which are also known as tar sands and bituminous sands, are found in Northern Alberta, Canada. The sands are composed of siliceous material with grains generally having a size greater than that passing a 325 mesh screen (44 microns) and a relatively heavy, viscous petroleum, called bitumen, which fills the voids between the grains in quantities of from 5 to 21 percent of total composition. (All percentages referred to herein are in weight percent unless noted otherwise.) Generally the bitumen content of the sand is between 5 and 15 percent. This bitumen contains typically 4.5 percent sulfur and 38 percent aromatics. Its specific gravity at 60° F. ranges generally from about 1.00 to about 1.06. The oil sands also contain clay and silt. Silt is defined as siliceous material which will pass a 325 mesh screen, but which is larger than 2 microns. Clay is material smaller than 2 microns, including some siliceous material of that size. Extensive oil sand deposits are also found elsewhere in the world, such as in the Orinoco heavy oil belt of Venezuela and in the area near Vernal, Utah. The mineral and bitumen of these deposits differ somewhat from those of the Alberta deposits. Compared with the Alberta oil sands, the Utah deposit contains a coarser sand, less clay and an even more viscous bitumen.

Much of the world resource of bitumen and heavy oil is deeply buried by overburden. For example, it has been estimated that only about 10 percent of the Alberta oil sand deposit is close enough to the earth's surface to be conveniently recovered by mining. The remainder is buried too deeply to be economically surface mined. Hydraulic mining or tunnel mining has been proposed for these deeper deposits. Generally, however, it is considered that enhanced recovery by steam injection, by injection of aqueous solutions, and/or by in situ combustion may possibly be more effective for obtaining bitumen or heavy oil from deeply buried formations. Such enhanced recovery methods use one or more oil wells that penetrate the formation and stimulate or recover the resource. Recovery of bitumen from a well by steam stimulation is described in Canadian Pat. No. 822,985 granted on Sept. 16, 1969 to Fred D. Muggee. Depending upon the procedure employed, enhanced recovery methods either produce mixtures of oil, water and water-in-oil emulsions or produce oil-in-water emulsions.

There are several well known procedures for separating bitumen from mined oil sands. In a hot water method, such as disclosed in Canadian Pat. No. 841,581 issued May 12, 1979 to Paul H. Floyd, et al., the bituminous sands are jetted with steam and mixed with a minor amount of hot water and sodium hydroxide in a conditioning drum to produce a pulp which passes from the conditioning drum through a screen, which removes debris, rocks and oversize lumps, to a sump where it is diluted with additional water. It is hereafter carried into a separation cell.

In the separation cell, sand settles to the bottom as tailings which are discarded. Bitumen rises to the top of the cell in the form of a bituminous froth which is called the primary froth product. An aqueous middlings layer containing some mineral and bitumen is formed between these layers. A scavenging step is normally conducted on this middlings layer in a separate flotation zone. In this scavenging step the middlings are aerated so as to produce a scavenger tailings product, which is discarded, and a scavenger froth product. The scavenger froth product is thereafter treated to remove some of its high water and mineral matter content and is thereafter combined with the primary froth product for further treatment. This combined froth product typically contains about 52 percent bitumen, 6 percent minerals, 41 percent water, all by weight, and may contain from 20 to 70 volume percent air. It resembles a liquid foam that is difficult to pump and, for that reason, is usually treated with steam to improve its flow characteristics.

The high water and mineral contents of the combined froth product normally are reduced by diluting it with a hydrocarbon diluent such as naptha. It is then centrifuged to produce a tailings product and a final bitumen product that typically contains essentially no water and about 1.3 percent solids and that is suitable for coking, hydrovisbreaking and other refining techniques for producing a synthetic crude oil. The tailings products, containing some naptha, are discarded.

There are basically four effluent streams from the Hot Water Process. Each carries with it some of the bitumen of the feed; thereby reducing the efficiency of the process. These include the oversize material, the sand and water tailings from the separation cells, the silt, clay and water tailings from the scavenger cells and the tailings from the centrifuges. Up to 10 percent of the bitumen in the original feed and up to $2\frac{1}{2}$ percent of the naptha stream may be lost in this manner. Much of this bitumen effluent finds its way into larger retention ponds that are typical of the Hot Water Process. The bottom of one such retention pond may contain up to 50 percent dispersed mineral matter substantially of clay and silt as well as 5 percent bitumen. As disclosed in Canadian Pat. No. 975,697 issued on Oct. 7, 1975 to Davitt H. James, this part of the pond contents, referred to as sludge, is a potential source of bitumen.

The Hot Water Process described in the preceeding paragraphs separates bitumen from a prepared oil sand slurry. Various methods for preparing oil sand slurries are taught in the prior art, as for example disclosed in Canadian Pat. No. 918,588 issued on Jan. 9, 1973 to Marshall R. Smith, et al. and in U.S. Pat. No. 3,968,572 issued on July 13, 1976 to Frederick C. Stuchberry. These apparatus as disclosed were especially designed to form a slurry that is hot, that contains finely dispersed air bubbles and wherein the bitumen is in the form of small flecks. Such a slurry is amenable to subsequent separation in a hot water bath after dilution, wherein bitumen forms into a froth that rises to the top of the bath and is skimmed therefrom. Alkaline reagents such as sodium hydroxide are normally added in this process to give to the slurry those properties that provide for efficient flotation of the bitumen in said water bath. However, in the presence of sodium hydroxide, fine clay particles in the effluent streams from this process do not settle readily. For this reason inordinately large settling ponds are required to contain the effluents from commercial hot water oil sands extraction plants.

The present invention applies to a method of treating various streams from oil sand operations having a dispersed oil or aqueous phase, to case combinations of dispersed particles, which combination improves the recovery of the oil phase by the use of apertured olephilic endless conveyor belts to achieve oil phase-aqueous phase separations. These processes are superior to the Hot Water Process because separations are conducted at lower process temperatures and with lower water requirements. For comparable oil sand feedstocks the bitumen production by combination of dispersed phase particles followed by oil phase-aqueous phase separation with an apertured olephilic belt as typically disclosed is more efficient than by a Hot Water Process.

The apertured oleophilic conveyor belt, that may be used to separate emulsions, slurries, or mixtures of oil phase and aqueous phase, typically consists of a mesh belt that is woven from fiber, string or wire of high tensile strength and fatigue resistance, that is oleophilic by nature or that is covered with a belt coating that is oleophilic. This belt typically is supported by two conveyor end rolls that provide tension and form to the belt. Separation is achieved by passing a slurry, emulsion or mixture of oil phase and water phase, with or without particulate solids, through the belt one or more times. Water phase and particulate solids in the water phase pass through the belt apertures and are discarded while oil phase attaches itself to the belt because of its attraction for the oleophilic belt surfaces. The oil phase subsequently is recovered from said belt as a product. Typical processes are disclosed in U.S. Pat. No. 4,224,138 which issued Sept. 23, 1980 to Jan Kruyer and U.S. Pat. No. 4,236,995 which issued Dec. 2, 1980 to Jan Kruyer.

BRIEF DESCRIPTION OF THE INVENTION

The purpose of the invention is to treat a mixture of water and immiscible hydrocarbon to facilitate subsequent separation.

In accordance with the broadest concepts of the present invention, a mixture of continuous phase and dispersed phase is tumbled with suitably surfaced free bodies in a horizontal rotating drum to prepare a mixture suitable for separation by an oleophilic apertured endless conveyor belt, wherein the aqueous phase readily passes through the belt apertures and is discarded while an optimum amount of oil phase is captured by the oleophilic surfaces of the belt and is carried away for removal from the belt surface for additional treatment or upgrading or is treated on the belt prior to removal.

The free bodies of the present invention are spheres, or more complex bodies, with surfaces that have affinity for dispersed phase particles. When tumbled in a drum together with an emulsion or a slurry, these free bodies cause particle size growth of the dispersed phase in this drum. The free bodies remain in the drum at all times while the mixture being treated passes through the drum and is acted upon or processed by the free bodies while in the drum.

In the preferred embodiment a continuous feed of oil-in-water emulsion, obtained from enhanced oil well or bitumen recovery, is tumbled in a drum with reagents and oleophilic free bodies to produce a continuous product of oil phase droplets and streamers in a continuous water phase.

In a second preferred embodiment, a continous feed of bitumen froth, or a water-in-oil emulsion, is tumbled in a drum with some hydrophilic free bodies (and preferably many oleophilic free bodies) to produce a continuous bitmen, or oil phase, product with reduced air content and/or wherein the dispersed water phase particles have grown in size.

In a third preferred embodiment a continuous feed of aqueous slurry, that contains dispersed bitumen, or oil, is tumbled in a drum with oleophilic (and possibly some hydrophilic or a combination thereof) free bodies to produce a continuous slurry product wherein the dispersed bitumen, or oil, particles have grown in size.

Following is a list of feedstocks and/or particles which may be treated according to the present invention:

1. An oils and slurry, from which debris, rocks and oversize lumps have been removed previously.
2. The middlings drag stream of a hot water oil sands extraction plant containing dispersed bitumen particles.
3. One or more of the effluent streams of a hot water oil sands extraction plant containing dispersed bitumen particles.
4. An effluent stream of a hot water oil sands extraction plant containing dispersed bitumen with naptha particles.
5. A sludge obtained from the retention pond of a hot water oil sands extraction plant containing dispersed bitumen particles.
6. Oil-in-water and/or water-in-oil emulsions, such as may have been obtained by enhanced oil recovery methods, tar sand operations, oil shale operations and the like.
7. A bituminous froth such as from the primary froth product or from the scavenger froth product of a hot water oil sand extraction plant.
8. A water-in-oil emulsion containing dispersed water-wet mineral particles.
9. A combination of two or more of the above sources in one operation.

It is an object of the present invention to provide a process which will increase the particle size of dispersed phase particles by cyclic coalescence, colligation, adsorbtion, concrescence, conglutination and/or coherence onto the surface of free bodies and subsequent cyclic shedding or sloughing off of cohered dispersed phase back into the mixture.

It is also an object of the present invention to provide a process which will increase the particle size of dispersed oil phase particles contained in a continuous water phase to enhance oil recovery from oil sands operations and secondary flooding of oil wells with aqueous solutions or steam.

It is further an object of the present invention to provide a process for the breaking of emulsions and/or reduction of air in froths in the processing of oil sands which result in increased particle sizes of the dispersed phase enabling more efficient oil phase-aqueous phase separations.

PRIOR ART

In searching the patent literature the closest prior art uncovered is an oil agglomeration process disclosed in Canadian Pat. No. 787,898 issued on June 18, 1968 to Ira A. Puddington, et al. In that process a mixture of oil phase and hydrophilic solids in an aqueous phase is subjected to cocurrent milling, kneading and agitation until the oil phase separates and is recovered as discrete agglomerates when the milling surfaces are hydrophilic or is recovered as an adherent layer when at least part of the milling surfaces are oleophilic. The differences between the present invention and that prior art are:

1. The prior art requires cocurrent milling, along with kneading and agitation, while in contrast the present invention only requires tumbling in a horizontal rotating drum.

2. The prior art uses hydrophilic milling surfaces to permit recovery of discrete semi-solid oil phase agglomerates, while in contrast the present invention uses free bodies with oleophilic surfaces to increase the size of oil phase particles.

3. Alternately, the prior art uses oleophilic milling surfaces to recover an adherent layer of oil phase therefrom whereas the present invention is not based upon oil phase recovery from milling surfaces but permits oil phase to accumulate on oleophilic surfaces of free bodies where it unites of coalesces and encourages subsequent flowing or dripping therefrom.

A process for agglomerating inorganic materials (ash) from pulverized coal is taught in U.S. Pat. No. 4,033,729 issued on July 5, 1977 to Capes, et al. In that process a continuous oil phase contains the dispersed coal and ash particles. Water and hydrophilic surfaced free bodies are added to the oil phase in a rotating drum. The water wets both the ash and the hydrophilic materials and serves as a form of glue such that when an ash particle contacts the hydrophilic surfaced free bodies, the ash adheres thereto. The ash buildup on the hydrophilic free bodies continues over a predetermined period of time to form an agglomerate of combined ash and free body which is then screened from the continuous oil phase containing the coal particles.

The agglomerated ash must be held to the free bodies and discharged from the drum in that form. If too much water is used it cannot effectively function as a glue and is displaced from the hydrophilic free body back into the oil phase carrying non-agglomerated suspended ash in water bubbles which pass through the screen along with the oil phase when the water-in-oil mixture containing the hydrophilic free bodies are discharged from the rotating drum onto the screen. In this process, hydrophilic free bodies must be continuously introduced into the drum and also be removed therefrom. If the free bodies are reused it is with the agglomerated ash still adhering to their surfaces. It therefore follows that the capacity of absorption of the free bodies will eventually reach a point where they will become inefficient since the patent teaches that efficiency decreases as free body size increases.

In the present invention the free bodies are preferably oleophilic and always remain in the rotating drum. They function to bring suspended oil phase particles in an aqueous phase together on their surface where they unite to form larger oil phase particles which are then shed from the surface of the oleophilic free body by physical forces back into the aqueous phase for discharge from the drum. Thus the function is significantly different. No glue is required to adhere the oil particles to the free body and keep them there and the relative proportion of oil phase to water phase is not critical as in the Capes, et al. patent. The free bodies can be used continuously and indefinitely. Moreover, the size of the free bodies utilized in the present invention are considerably larger than the free bodies advocated in the Capes, et al. patent.

DRAWINGS

DETAILED DESCRIPTION OF THE INVENTION

Figure 1:
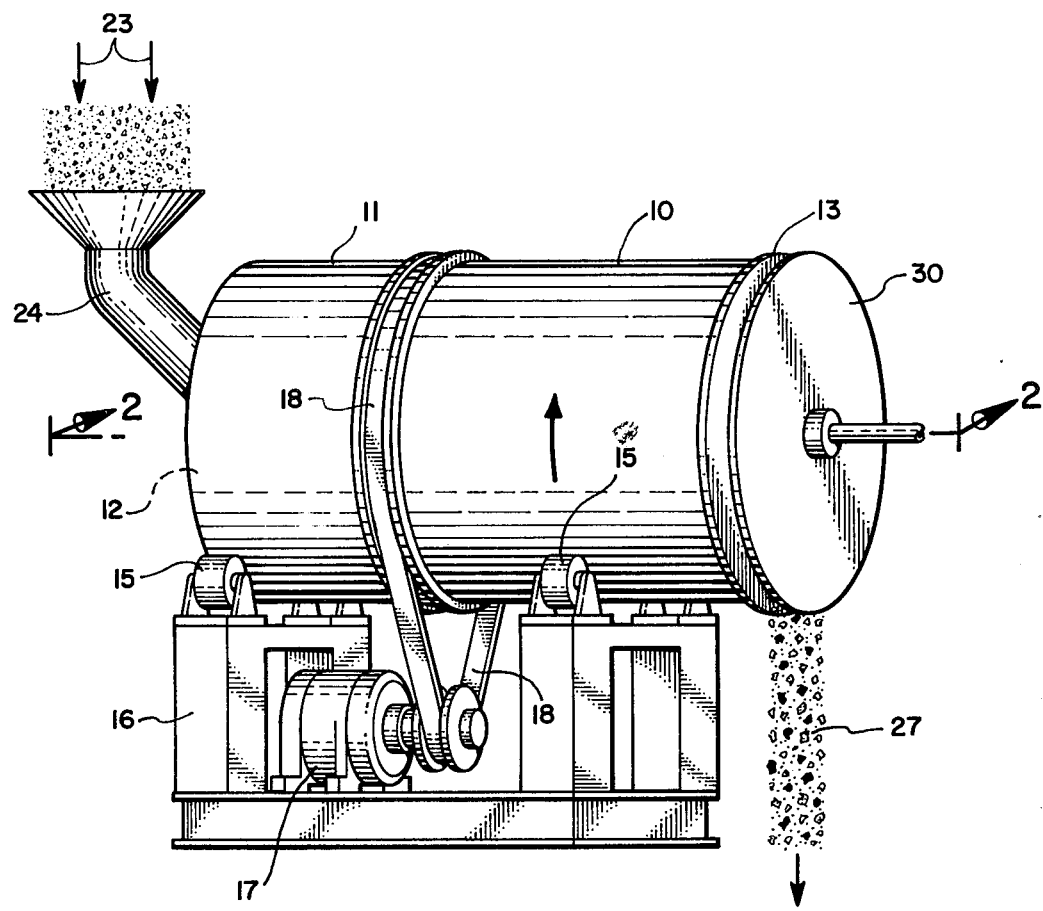
FIG. 1 is a perspective view showing the horizontal drum used in the present invention to tumble a feed with free bodies for the purpose of increasing the size of dispersed phase particles.

As used in the present invention "water-in-oil emulsion", "oil phase" and "bitumen" all refer to fossil oils that may contain water droplets and particulate solids. "Bitumen froth" refers to bitumen that contains water phase and solids, and significant quantities of entrained gas. "Oil-in-water emulsion" refers to a stable mixture of small oil phase droplets dispersed in a continuous water phase and may contain up to about 5 percent particulate solids. "Slurry" refers to a mixture containing continuous water phase, dispersed oil phase and more than 5 percent particulate solids. "Aqueous phase" refers to any type of continous water phase; it may contain particulate solids, oil particles and/or chemicals and it generally is used to describe a slurry or emulsion that has passed or is to be passed through an apertured oleophilic belt. "Dispersed phase" refers to that phase in the mixture, emulsion or slurry that is not continuous.

It is to be understood that the present invention is to separate heavy or light oil from particulate solids and/or water, no matter from where they originate. For example, Canadian Pat. No. 726,683 issued on Jan. 25, 1966 to Albert F. Lenhart discloses that oils derived from solid carbonaceous materials, such as from oil shales, coals, and the like, usually are recovered in the form of oil-water emulsions when in-situ combustion is practiced to convert these solid carbonaceous materials to oils. That same patent also discloses that in the recovery of conventional crude oil from wells, oil-water emulsions are produced as well on many occasions. A paper by L. S. Johnson, et al. of the United States Department of Energy, presented at the 13th Intersociety Energy Conversion Engineering Conference in San Diego, Calif. on Aug. 20-25, 1978 discloses that oil-water emulsions, containing particulate solids, usually are produced when oil is recovered by in-situ combustion of tar sands.

It has been found that when an oil-in-water emulsion is tumbled in a drum in the presence of free bodies that have oleophilic surfaces, this emulsion undergoes a partial separation in which oil phase droplets of the emulsion unite together to produce larger droplets and streamers of dispersed oil phase that readily may be separated subsequently from the continuous water phase. Additions of emulsion breaking chemicals such as alkaline earth salts to such emulsions significantly increase the production of such droplets and streamers by removing repulsive forces from the dispersed phase which permits cohesion of dispersed phase particles on the oleophilic surfaces of free bodies.

When a slurry of dispersed particles of oil phase, continuous water phase and particulate solids are tumbled in a drum in the presence of free bodies that have oleophilic surfaces, these dispersed oil phase particles unite to produce droplets and streamers that are larger in size than the dispersed oil particles originally present in the slurry.

When a water-in-oil emulsion, that may contain particulate solids and air, is tumbled in a drum in the presence of free bodies that have hydrophilic surfaces, this emulsion undergoes a partial separation in which water droplets trapped by the continuous oil phase form into larger droplets or bodies of water which subsequently can be more easily separated from the oil phase. Air bubbles collapse and water-wet particulate solids gather with the water phase. Emulsion breaking chemicals, when added to the mixture, help in this mechanism of particle size growth by removing repulsive forces from the particles and permitting cohesion of dispersed phase particles on the hydrophilic surfaces of free bodies.

The present invention takes advantage of these discoveries to prepare mixtures of dispersed phase and continuous phase for separation by an apertured oleophilic belt or other appropriate means.

FIGS. 1 to 5 illustrate an apparatus for treating, with free bodies a continous feed mixture of oil phase and aqueous phase to enlarge the particle size of dispersed particles enabling better subsequent separation of the two phases.

The drum 10 of FIG. 1 is a horizontal, rotating cylinder having rear 12 and front 13 ends, each partially closed by a washer. The cylindrical side wall 11 is provided with internal protrusions or ribs 14 that encourage mixing of the drum contents by the rotating drum. The drum is supported on rollers 15 connected to a frame 16 and contains a drive motor 17 and drive means 18.

Figure 2:
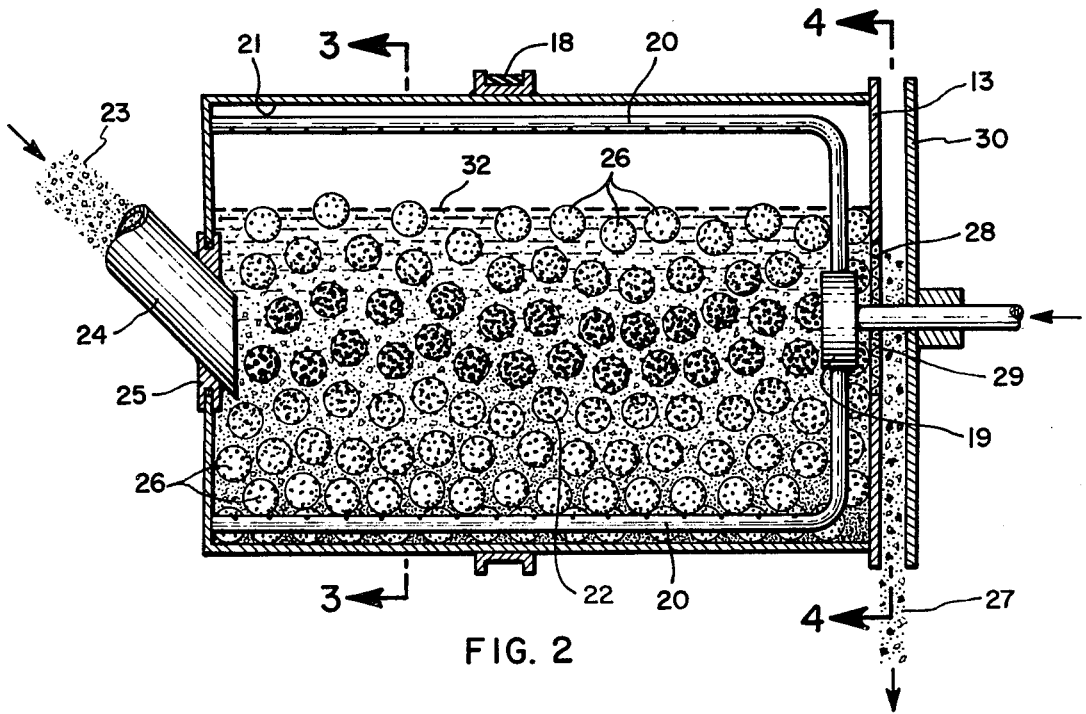
FIG. 2 is a cross sectional view of the drum of FIG. 1 taken along the lines 2—2 of FIG. 1 showing the contents of the drum and adjustable means to control the rate of product flow from the drum.
Figure 3:
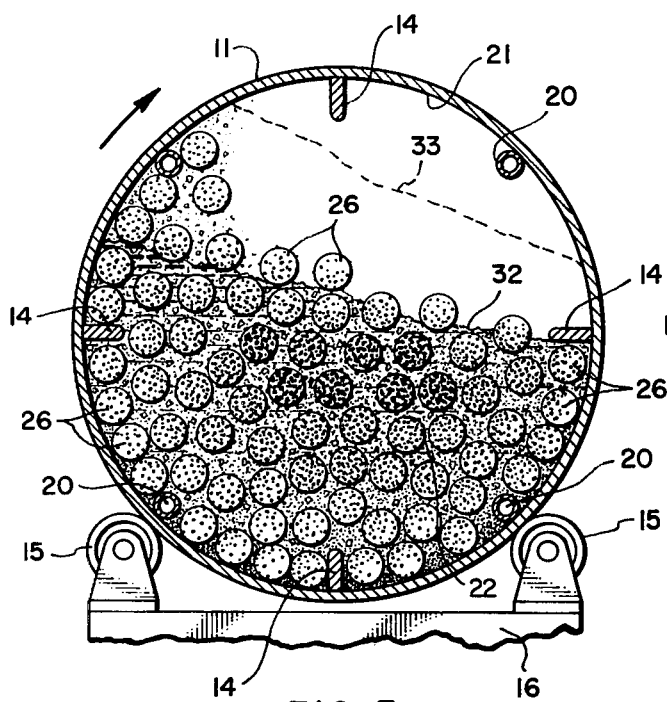
FIG. 3 is a cross sectional view of the drum of FIG. 1 taken along the lines 3—3 of FIG. 2.

When conditions require, steam may be introduced into the interior of the drum 10, illustrated in FIGS. 2 and 4, through a rotatable distributor valve 19, which feeds it to a series of perforated pipes 20. These pipes 20 extend longitudinally along the interior cylindrical surface 21 of the drum 10 in spaced relationship about its circumference. The valve 19 feeds the steam to the pipes 20 only when they are submerged within the drum contents 22. The mixture to be treated 23 is fed into the rear end 12 of the drum by way of a pipe 24. A seal 25 prevents drum contents 22 from spilling out of the rear 12 of the drum. Alternately, the mixture may be fed to the drum 10 through a flexible rotating hose that is attached to the central part of the drum rear 12. The drum contains free bodies 26 that tumble through the drum contents 22. Product 27 leaves the drum 10 through an opening 28 that is covered with an apertured wall 29 such as a mesh screen, or a perforated plate, to permit passage of prepared product but which prevents passage of free bodies 26 from the drum 10.

Figure 4A:
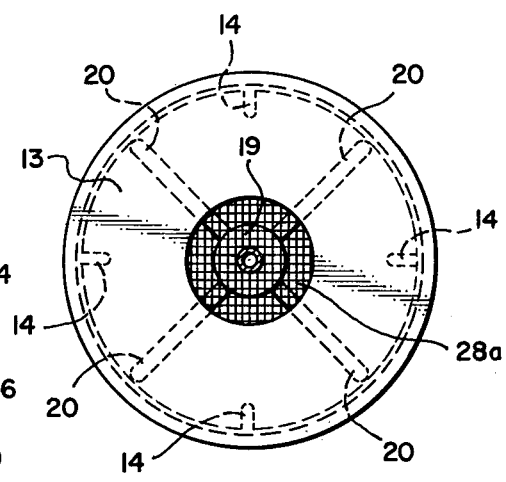
FIG. 4a is a view of a drum exit in the form of a sieve covered central opening.
Figure 4B:
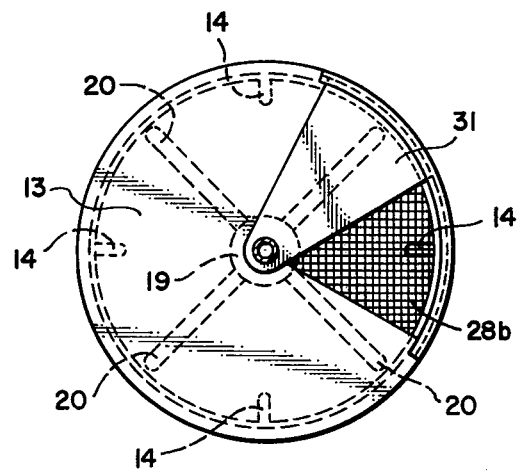
FIG. 4b is a view of a drum exit in the shape of a sieve covered pie with a sliding gate to control the size of the exit.
Figure 4C:
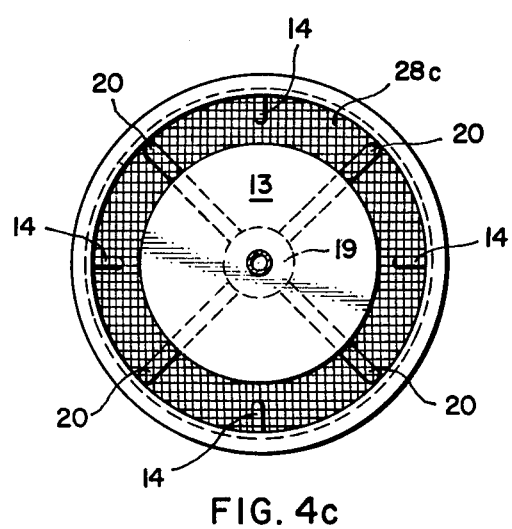
FIG. 4c is a view of a drum exit in the form of a sieve covered annular opening.

Various types of drum product exits 28 are illustrated in FIGS. 4a, 4b and 4c. FIG. 4a illustrates a central opening 28a in the drum wall. FIG. 4b illustrates a pie shaped opening 28b whereof the size may be controlled by a sliding gate 31 and FIG. 4c illustrates an annular opening 28c. The flow rate of product from the drum and hence the level in the drum may be controlled by means of the cover plate 30 of FIG. 2 by adjusting the distance between the cover plate 30 and the drum front wall 13. The type of product exit selected determines to some degree the concentration in the drum contents 22. For example, if an oil sand slurry 23 is fed to the drum wherein mineral particles readily settle to the wall 21 of the drum 10, but wherein bitumen preferably occupies the central regions of the drum 10, then, with an annular exit 28c as in FIG. 4c, bitumen will accumulate in the drum so that for steady state conditions the bitumen concentration in the drum 10 will be higher than the bitumen concentration in either the feed 23 or the product 27. Conversely, when for the same feed 23 a central exit opening 28a as shown in FIG. 4a is chosen, concentration of solids will take place in the drum 10. Thus, for steady state conditions, the solids concentration in the drum 10 may be higher than the solids concentration in either the feed 23 or the product 27 streams. Other types of opening 28 may be chosen to reduce such concentration change as for example by the use of an annular opening 28c of smaller radius than the opening of FIG. 4c. The pie shaped opening 28b of FIG. 4b may provide for a cyclic variation in the level of contents in the drum. An alternate method of removing contents from the drum is to provide a perforated cylindrical wall on the horizontal rotating drum and to permit the contents to flow out unhindered through the perforations, or to immerse the thus perforated drum partly in a tank or cover in such a way as to maintain a level of contents in the tumbler; the contents flowing through the perforations into the tank and spilling over an endwall of the tank, thus controlling said level. The contents that flow from said tank or cover is then sent to the separator for processing while the free bodies are kept in the drum by making the perforations smaller than the free bodies. Paddles may be attached to the outside of the perforated drum wall to prevent settling of solids in the tank which, if permitted to settle, would hinder rotation of said perforated drum.

The drum 10 may be rotated by the motor 17 and associated drive 18 at any rate of rotation that is most effective for the mixture 23 to be treated, from very slow up to but not exceeding two times the critical rate. The critical rate of rotation is reached when, at the apex of the inside drum surface 21, the centrifugal force equals the force of gravity. Critical rotation is defined in revolutions per minute as:

$$\text{Critical rotation rate} = \sqrt{\frac{2936}{r}}$$

where r is the drum inner radius in feet. Above this critical rate, some drum content commences to attach itself to the drum wall and does not readily mix with the remainder of the drum contents. At rotation rates between one and two times the critical rate, progressively more of the drum content attaches itself to the drum wall and does not take part in the tumbling process operating in the drum 10. Rotating the drum 10 at more than twice the critical rate is not the intent of the present invention. The desired rate of drum 10 rotation varies with each type of feed 23 being treated and is influenced among others by the viscosity of the mixture 22, the density difference between the mixture 22 and the free bodies 26, the solids content of the mixture 22, and the level of the drum contents 22. The term "critical rotation rate" denotes a drum rotation rate such that the centrifugal force at the inside drum surface at the apex of the drum equals the force due to gravity.

For many of the mixtures 22 treated, the drum 10 will be maintained more than half full, level 32, and for some mixtures 22 the drum 10 may be kept substantially filled, level 33, as long as the viscosity of the feed mixture 22, the solids concentration and the density difference between the components of the mixture 22 and the free bodies 26 permit for a continuous thorough mixing of the drum contents, with said free bodies 26.

Without in any way attempting to limit the scope of this invention the following theory is offered. It is believed that the oil phase particle size growth that takes place when a mixture of continuous aqueous phase and dispersed oil phase is tumbled in a drum in the presence of oleophilic free body surfaces may be explained as a mechanism of oil film building and shedding. In this mechanism, dispersed oil phase particles of the mixture in the drum come in contact with an oleophilic surface, adhere thereto, unite on that surface with other oil phase particles and form into a coat that continues to grow in thickness until the forces of self adhesion in the oil phase coat cannot resist the forces of erosion on the coat surface caused by the movement of mixture past this coat. At that instant the coat begins to shed oil phase particles which, for the conditions of the present invention on the average, are larger than the oil phase particles originally present in the mixture fed to the drum. The force of erosion varies with location in the drum contents and since the free bodies in the drum are mixing and moving in the drum, therefore the force of erosion on the oleophilic surface of a free body varies with time; thus permitting a cyclic accumulation of oil phase on free bodies and a cyclic shedding of accumulated oil phase therefrom. The shed oil phase particles appear to increase in size with an increase in oil phase viscosity.

Similarly, free bodies with hydrophilic surfaces may be used to collect water phase on their surfaces and to provide for an increase of particle size of aqueous phase in a mixture with continuous oil phase. A combination of oleophilic and hydrophilic free bodies may be used to advantage in cases where it is desirable to remove particles of continuous phase out of dispersed phase particles that are being increased in size. Thus free bodies with hydrophilic surfaces may be added to the free bodies with oleophilic surfaces in the drum to treat a mixture containing continuous aqueous phase. Conversely, free bodies with oleophilic surfaces may be added to the free bodies with hydrophilic surfaces in the drum to treat a mixture containing continuous oil phase.

Free bodies may be in the form of spheres, spheroids, pebbles, teardrops, rods, discs, saddles, snowflakes or of any other shape, simple or complex, which is effective in searching out dispersed phase particles in the mixture. The free bodies may be solid, hollow, or apertured. They may also be smooth, but are preferably of a rough or of a porous surface. The size of the free bodies used in said drum depends to a large degree upon the consistency of the mixture in the drum that is to be treated. The mean dimension of these free bodies preferably is within the range 0.1 to 10.0 inches and most preferably within the range 0.5 to 2.0 inches. However, free bodies larger than 10 inches and smaller than 0.1 inch can be used without departing from the scope of the present invention.

Figure 5A:
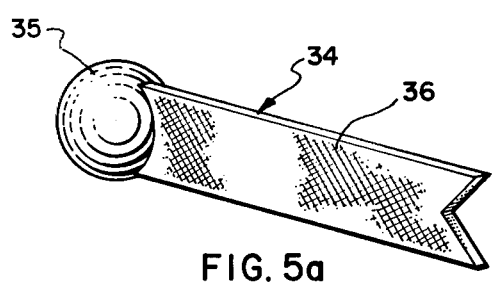
FIGS. 5a, 5b and 5c are illustrative free bodies having both oleophilic and hydrophilic surfaces.
Figure 5B:
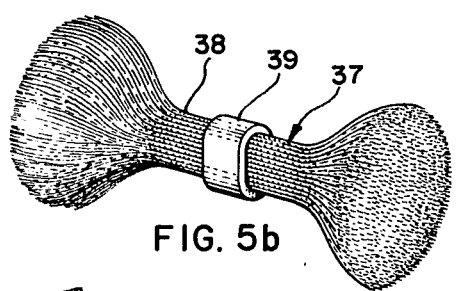
Figure 5C:
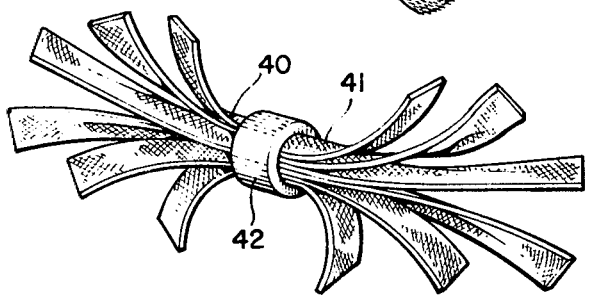

The free bodies may also be configured to contain both oleophilic and hydrophilic surfaces. Examples of such bodies are disclosed in FIGS. 5a, 5b and 5c. However, these Figures are not intended to be self limiting as any other configuration, simple or complex, may be used. FIG. 5a shows a free body 34 consisting of a hydrophilic head 35 and an oleophilic tail 36 or streamer. FIG. 5b shows a free body 37 consisting of a frayed oleophilic rope fiber 38 secured in a crimped hydrophilic ring 39. FIG. 5c illustrates a body 40 consisting of a series of oleophilic strands or straps 41 secured by molding into a ceramic hydrophilic ring 42.

The desired density of the free bodies varies with the shape and size of the bodies used, the viscosity of the oil phase, the solids content of the mixture and the level of the contents maintained in the drum. It is preferably within the range 30 to 800 pounds per cubic foot and most preferably within th range 200 to 500 pounds per cubic foot.

Free bodies may be cast, molded, formed or fabricated in other ways. Oleophilic free bodies may be made with oleophilic materials or they may be made from other materials and then covered with a coating of a strongly oleophilic material that is abrasion resistant, resistant to oil phase of the mixture under treatment and that may be made to adhere strongly to the body. Suitable oleophilic materials that may be used in the fabrication of oleophilic free bodies are neoprene, urethane, polypropylene, plastics and artificial rubbers, brass steel, alloy steel, or other abrasion resistant metals. Free bodies made from steel coated with a layer of cadmium, tin or molybdenum have been found to be surprisingly effective. These coatings are oleophilic but are not sufficient abrasion resistant for prolonged usage. However, it is thought that as the coating is abraded from the free body the exposed steel surface is impregnated by the oil phase before an oxide layer can be formed thereby preserving the oleophilic nature of the steel surface. Thus when using steel, alloy steel, brass or other metals which may be covered with a thin layer of metal oxide, it may be necessary to first remove such layer by abrasion or other means to maximize the oleophilic nature of that free body. Hydrophilic free bodies may be made using ceramics, glass, carbides or other strongly hydrophilic materials. Pebbles or flint may be used as well.

The particulate solids content of the mixture preferably is within the range of 0.0 to 0.9 pounds of solids per pound of mixture and most preferably 0.0 to 0.4 pounds of solids per pound of mixture.

The desired viscosity of the phases of the mixture depends upon which is the continuous phase. When oil is the continuous phase of the mixture, the preferred viscosity of the oil phase is such that permits the free bodies to freely travel through the mixture and is within the range 0.01 to 500 poises, with the most preferred range being 0.1 to 50 poises. When oil is the dispersed phase of the mixture, the preferred viscosity of the oil phase is such as to provide optimum "tackiness" to the oil phase particles and is within the range 0.1 to 50,000 poises, with the most preferred range being 1.0 to 5000 poises. Generally, "tackiness" refers to the ability of oil particles to adhere to themselves and to oleophilic surfaces.

While particle size enlargement may be achieved in small rotating horizontal drums, effectiveness of the present invention may be enhanced by the use of large diameter drums since these, for a given mixing action, may rotate at a slower rate. Such a slower rate of rotation in larger drum sizes may provide for longer accumulation and shedding cycles of dispersed phase on and from free body surfaces and in many cases provides for improved performance of the present invention. The preferred drum diameter is within the range 7 to 70 feet and the preferred drum length is within the range 10 to 200 feet.

Reagents may be added to the mixture before it enters the drum or while it is in the drum, for the purpose of aiding in the process of the present invention, for breaking emulsions, for increasing the affinity of the dispersed phase for the surfaces of the free bodies, for increasing the affinity of the surfaces of the free bodies for the dispersed phase, and/or for increasing the affinity of particulate solids in the mixture for one of the phases of the mixture. Addition of inorganic alkaline earth hydroxides or salts, such as for example calcium sulphate or calcium hydroxide, is very effective for breaking tight oil sand oil-in-water emulsions and for rapid accumulation of bitumen coatings on the free bodies in the mixture. Non-ionic, water soluble polyethylene oxide polymers having a molecular weight in the range of 10,000 to 7,000,000 added to the mixture may serve to aid the alkaline earth chemicals in breaking tight oil-in-water emulsions. A suitable temperature for adding such polymers to the mixture is when the mixture is in the range of 120° F. to 210° F. Depending upon the desired temperature for uniting of dispersed oil phase particles, this polymer addition may be made to the drum contents or it may be made to the feed prior to entering the drum. In this latter case, the feed may be cooled prior to entering the drum for the purpose of operating both the chemical treatment step and the dispersed particle size growth step at differing optimum temperatures. U.S. Pat. No. 4,058,453 issued on Nov. 15, 1977 to Mahendra S. Patel, et al. discloses the use of such a polymer mixture to break an oil-in-water emulsion. However, instead of using free bodies for that purpose, as disclosed in the present invention, Patel, et al. disclose the need for a hydrocarbon diluent to collect the dispersed phase, which is not required in the present invention.

Non-ionic surface active compounds, as for example a chemical demulsifier comprising polyethoxyalkene compound sold under the trade name of NALCO D-1645 produced by the Nalco Chemical Company, may be added to the feed or to the drum for the purpose of breaking a water-in-oil emulsion and of making it easier for the free bodies to enlarge dispersed water phase particles.

Another demulsifier for adding to a water-in-oil emulsion in the present invention is sold under the trade name of BREAXIT 7941 and comprises a mixture of: (1) one part of the reaction product of diethyl ethanolamine with premixed propylene oxide and ethylene oxide; and (2) approximately three parts of a palmitic acid ester of the reaction product of an alkyl phenol formaldehyde resin with ethlene oxide. Other demulsifiers that may aid free bodies in increasing the mean water particle size of a water-in-oil emulsion in the present invention are polyoxypropylene glycols produced by the Wyandotte Chemical Company under the tradename "Pluronic".

An enhanced transfer of particulate solids to the water phase of the mixture tumbling with free bodies in the drum of the present invention may, in some mixtures, be effected by addition to these mixtures of hydrophilic surface active transfer agents, such as polyphosphates. Any water soluble salt of pyrophosphoric acid, $H_2P_2O_7$, such as for example tetrasodium pyrophosphate or sodium tripolyphosphate, are transfer agents and may be mixed with the feed or the drum contents in proportion of 0.01 percent to 1.0 percent to effect an improvement in the recovery of particulate solids in the water phase. Addition of sodium hydroxide with said polyphosphate reagent in about equal proportion may aid in effecting the improvement.

In instances where the oil phase of the mixture may contain heavy mineral; for example, bitumen may contain as high as 1 to 10 percent of heavy minerals as for example zircon, rutile, ilmenite, tourmaline, apatite, staurolite, garnet, etc., it may be desirable to employ chelating agents to make these particulate heavy minerals water wet and cause them to report to the water phase. Examples of suitable chelating agents are ethylenediamine-tetraacetic acid, sodium gluconate, gluconic acid, sodium oxalate and diethylene glycol. Chelating agents may be added to mixtures wherein oil is the continuous phase or they may be added to mixtures where water is the continuous phase. Generally they are the most effective when added to mixtures in which oil is the continuous phase.

In summary, the present invention uses free bodies, some or all having surfaces with affinity for the dispersed phase of a mixture being tumbled with said free bodies, in a horizontal rotating drum for the purpose of increasing the average particle size of said dispersed phase in the mixture. Reagents may be added to the feed of said drum, or to said drum, to enhance the process of dispersed phase particle size growth, or to collect particulate solids into the water phase.

The "oil-in-water" emulsions that may be treated in this manner may include mixtures of dispersed oil phase containing either medium crude oils, heavy crude oils or bitumen. The "water-in-oil" emulsions that may be treated in this manner may include bitumen froth, bitumen, heavy crude oil or medium crude oil. The "oil-in-water and solids" slurries that may be treated in this manner include oil sand slurries from which oversize materials have been removed, bitumen depleted oil sand slurries, the middlings stream of a hot water oil sands extraction plant, or slurries of sludge from the effluents settling pond of a hot water oil sands extraction plant.

Internal drum walls may be made oleophilic and such walls may contain oleophilic inwardly extending baffles such as disclosed in copending application Ser. No. 178,001 filed of even date herewith, to aid the operation of oleophilic free bodies or such wall and baffles may be made hydrophilic to aid the operation of hydrophilic free bodies. The method of the present invention may be more fully understood by the following examples illustrating the same. The efficacy of the invention as shown in the examples is judged by comparing a raw feed stock with a feed treated according to the present invention using the Oleophilic Sieve Test. The Oleophilic Sieve Test involves the following steps:

1. A neoprene coated 4 mesh Tyler screen and bottom cover are cleaned, dried and weighed.

2. The cover is removed. The feed stock is passed through the screen while the screen is immersed 1.0 inch below the level of a water bath, maintained at 110° F. The screen is shaken gently while in the water and then is removed from the water bath.

3. The bottom cover is fitted onto the screen and then both are dried in an oven at 212° F. cooled and then weighed.

4. The increase in weight is recorded as being the bitumen left on the screen. This bitumen usually contains some solids which for purposes of the test are part of the bitumen.

EXAMPLE I

An oil sand feed, consisting of 80.5 percent solids, 6.9 percent bitumen and 12.6 percent water is treated with water and stream in a conditioning drum according to the method disclosed in Canadian Pat. No. 918,588 issued on Jan. 9, 1973 to Marshall R. Smith, to produce a slurry product of oil sand and water. Slurry product from this conditioning drum is then treated by the process of the present invention. It is first screened through a 5 mesh sieve to remove oversize materials. The screened product is introduced into a drum such as is illustrated in FIG. 1. The drum is 6.0 feet in diameter and 6.0 feet long and is filled to 30 percent of its volume with 0.5 inch diameter steel balls that have been coated with a 0.05 inch thick urethane layer. These spheres are oleophilic. Lengthwise baffles on the interior cylindrical wall of the drum cause mixing of the drum contents and prevent the cylinder wall from sliding past the drum contents. The screened slurry product is introduced into the rear of the drum through a flexible hose at a constant rate of 12.0 tons per hour. Slurry water content is about 25 percent and its temperature is approximately 170° to 180° F. Water at about 70° is added to the rear of the drum at the rate of six tons per hour to cool and dilute the slurry. The drum is rotated at approximately 10 rpm. Product mixture leaves the drum through a concentrate annular port in the drum front wall that has been covered with reinforced 2 mesh screening. The port size is adjusted to maintain more than 80 percent of the drum volume occupied by slurry and spheres. Temperature in the drum stabilizes at about 115° F. After steady state conditions have been achieved, samples taken from the slurry feed entering the drum are cooled to 35° F. and are compared with samples taken from the slurry product leaving the drum. A visual inspection of the feed sample shows bitumen flecks generally smaller than 0.05 inch, while a visual inspection of the product sample shows bitumen streamers and globules very much larger than 0.10 inch. One pound of feed sample, maintained at 110° F., is passed through a standard 4 mesh Tyler screen according to the Oleophilic Sieve Test. The slurry passes through the mesh apertures and 0.14 pound of bitumen remains behind on the screen. Similarly, one pound of treated product sample at 110° F. is passed through the same test but in this case 0.39 pound of bitumen remains behind on the screen. The recovery of the bitumen from treated product is 2.8 times greater than from untreated product.

EXAMPLE II

A middlings feed material from a hot water oil sands extraction plant, comprising 72.5 percent water, 25.0 percent silt and clay and 2.5 percent bitumen, is cooled to about 110° F. and then is treated in the same drum used in Example I. Doughnut shaped free bodies, vulcanized from a mixture of brass particles and neoprene that are 1.0 inch in diameter, 0.5 inch in cross section, and have 0.5 inch holes in the center, fill the drum to about 40 percent of its volume. These free bodies have a density of 200 pounds per cubic foot and their surfaces are oleophilic. A flow of 9.0 tons per hour of feed is treated in the drum, which rotates at 15 rpm and which is kept filled to 70 percent of its capacity. A sample of untreated feed is cooled to 35° F. and is inspected. Bitumen drops can be observed in the continuous water phase. On the average these drops in the untreated feed are much smaller than 0.02 inch in size. A pound of this untreated slurry, passed through the Oleophilic Sieve Test at 110° F. leaves less than 0.01 pound of bitumen thereon. A sample of treated product mixture cooled to 35° F. shows by inspection that more than half of the bitumen is in the form of droplets and streamers that are much larger than 0.05 inch. A pound of treated product passed through the Oleophilic Sieve Test at 110° F. leaves more than 0.02 pound of bitumen thereon. Thus, it is evident that increasing bitumen particle size prior to recovery results in a recovery that is at least twice as great as bitumen recovered from the untreated feed.

EXAMPLE III

A bitumen-in-water emulsion product from a pilot plant that used steam injection to recover bitumen from deeply buried oil sand formations is cooled to 105° F. and then is treated in a drum as shown in FIG. 1. No water is added. The emulsion consists of about 10 percent bitumen and about 90 percent water and less than 1.0 percent clay particles. Spheres of neoprene, 0.35 inch in diameter, fill the drum to about three quarters full. One ton per hour is treated in a 2.0 feet diameter, 3 feet long drum that is kept filled to about 95 percent of its volume by the mixture of emulsion and spheres. The drum rotates at 25 rpm. Five pounds per hour of calcium sulphate is continuously added to the emulsion feed as it enters the drum and thoroughly mixes with the drum contents. A sample of untreated feed emulsion is cooled to 35° F. and is inspected visually through a microscope. The average bitumen particles in this emulsion are found to be smaller than 0.01 inch in diameter. Very little bitumen remains behind on the screen during an Oleophilic Sieve Test and the emulsion passing through this screen analyzes 9.2 percent bitumen. Inspection of the treated product of the drum, however, shows streamers of bitumen and a flow of water leaving the drum. When one pound of product water is passed through the Oleophilic Sieve Test at 110° F. and is thereafter analyzed, it is found to contain less than 1.0 percent bitumen. A sample of dried bitumen product from the drum is tested for viscosity by means of a Model LVT Brookfield Synchro-Lectric viscometer with a No. 4 spindle. At 105° F. its viscosity is found to be approximately 275 poises. According to the above results the recovery of bitumen from untreated product is about 10 percent whereas the recovery of bitumen from treated product is in excess of 90 percent.

EXAMPLE IV

A scavenger froth product from a hot water oil sands extraction plant containing 42 percent bitumen, 12 percent solids and 46 percent water is treated in the apparatus used in Example I at a temperature of 160° F. The 6.0 feet diameter and 6.0 feet long drum is filled to one-half full with 0.75 inch flint pebbles and 0.75 inch spheres molded from a mixture of litharge and neoprene to give these spheres a density of 150 pounds per cubic foot. There are about an equal number of pebbles and spheres in the drum that rotates at 10 rpm. Six tons per hour of froth, containing 35 volume percent air, is fed to the drum that is kept filled completely. Air bubbles of the froth feed collapse in the drum because of the tumbling and stirring action of the free bodies. The product of the drum that leaves through a mesh covered exit consists of water, that contains particulate solids, and a bitumen product that contains less than 20 percent water and less than 10 percent solids.

EXAMPLE V

An oil sand feed, consisting of 80.5 percent solids, 6.9 percent bitumen and 12.6 percent water is treated with water and steam in a conditioning drum to produce a slurry product of oil and water. The slurry product is then screened to remove large oversize materials. After that, coarse sand and additional oversize material is removed by means of elutriation. The elutriation apparatus consists of a vessel filled with water that flows upward through the vessel. The slurry is introduced into this apparatus. Oversize mineral material and undigested oil sand fall to the bottom of the vessel through the upward flowing water stream and are discarded. The water spills over the top of the vessel and carries with it bitumen particles and fine mineral particles in the form of an overflow slurry. This overflow slurry is treated by the method of the present invention for the purpose of increasing the bitumen particle size to facilitate subsequent separation of bitumen therefrom. Said overflow slurry is introduced into a drum such as is illustrated in FIG. 1. The drum is 6.0 feet in diameter and 6.0 feet long and is filled to 40 percent of its volume with 1 inch long pieces of 1 inch diameter tubing that has a wall thickness of 0.065 inch and of which each piece has been coated with a 0.005 inch layer of tin. Under the conditions existing in the drum, these free bodies made from steel and tin are oleophilic. The overflow slurry is introduced into the rear of the drum at a rate of 12 tons per hour through a pipe that conveys the slurry from a collar around the elutriation apparatus, through said pipe into the rear of said drum. A seal is provided between said pipe and said rear of the drum to prevent slurry from spilling out of the drum at the rear. The drum is rotated at approximately 10 rpm. Product mixture leaves the drum through a concentric annular port in the drum front wall that has been covered with reinforced 2 mesh screening. The port size is adjusted to maintain more than 75 percent of the drum volume occupied by slurry and free bodies. Oleophilic baffles mounted along the drum inside wall encourage mixing of the free bodies with the slurry. Temperature of the drum contents is 120° F. After steady state conditions have been achieved, samples taken from the feed to the drum and samples taken from the product of the drum are cooled to 35° F. and are compared with each other. The bitumen particles in the product from the drum are significantly larger than the bitumen particles in the feed to the drum. One pound of feed sample is treated by the Oleophilic Sieve Test. The slurry passes through the apertures and 0.018 pound of bitumen remains behind on the screen. Similarly, one pound of product is also treated by the Oleophilic Sieve Test, but in this case 0.045 pound of bitumen remains behind on the sieve.

In addition to enhanced bitumen recovery this example also illustrates the feasibility of removing oversize materials prior to contacting the oil sands slurry with free bodies to increase oil phase particle size.

Although the invention as has been described is deemed to be that which forms the preferred embodiments thereof, it is recognized that departures may be made therefrom and still be within the scope of the invention which is not to be limited to the details disclosed but is to be accorded the full scope of the claims so as to include any and all equivalent methods and apparatus. For example, the drum may be inclined instead of being perfectly horizontal without departing from the scope of the invention. Other similar modifications will also become apparent to those skilled in the art. One such modification would be to apply the process to the recovery of oils, fats and greases from plant and animal sources. For example, effluent streams from slughter houses, potato chip plants, rapeseed or cottonseed oil pressing operations could be treated to remove the fat or oil content from such streams.

I claim:

1. A method for increasing the mean particle size of dispersed oil phase particles in a liquid mixture of continuous aqueous phase, with or without solids, and dispersed oil phase, with or without solids, which comprises the steps of:
   a. introducing said mixture into a generally enclosed horizontal rotating drum that contains retained free bodies having oleophilic surfaces that have affinity for oil phase particles,
   b. agitating said mixture in the rotating drum so that said oleophilic surfaced free bodies continually mix with said mixture and come in contact with said dispersed oil phase particles causing said dispersed oil phase particles to temporarily adhere to the surface of said free bodies and unite to form enlarged oil phase particles until such enlarged oil phase particles become sufficiently large that they are redispersed into said mixture from the surface of said free bodies as enlarged dispersed oil phase particles by the physical forces operating within said rotating drum as a result of said agitation, and
   c. removing said mixture containg said enlarged dispersed oil phase particles from said drum containing said retained free bodies for subsequent separation of said enlarged dispersed oil phase particles from said continuous aqueous phase.

2. The method as set forth in claim 1 wherein the free bodies are spheres or spheroids.

3. The method as set forth in claim 1 wherein the dispersed oil phase has a viscosity in the range from 0.1 to 50,000 poises.

4. The method as set forth in claim 3 wherein the dispersed oil phase has a viscosity in the rage from 1.0 to 5000 poises.

5. The method as set forth in claim 4 wherein the free bodies have a density of from 30 to 800 pounds per cubic foot.

6. The method as set forth in claim 5 wherein the free bodies have a density range of from 200 to 500 pounds per cubic foot.

7. The method as set forth in claim 5 wherein the free bodies have dimensions within the range of 0.1 to 10.0 inches.

8. The method as set forth in claim 7 wherein at least a portion of the internal surfaces of said drum are oleophilic.

9. The method as set forth in claim 7 wherein the free bodies have a rough surface.

10. The method as set forth in claim 7 wherein the free bodies have a porous surface.

11. The method as set forth in claim 7 wherein the free bodies have both oleophilic and hydrophilic surfaces.

12. The method as set forth in claim 7 wherein said drum also contains free bodies with hydrophilic surfaces.

13. The method as set forth in claim 7 wherein the free bodies have dimensions within the range of 0.5 to 2.0 inches.

14. The method as set forth in claim 8 wherein the free bodies are fabricated from metal.

15. The method as set forth in claim 14 wherein the free bodies are pretreated to remove metal oxide from their surfaces to cause them to become oleophilic and to permit dispersed oil phase particles to form a coating on their surfaces.

16. The method as set forth in claim 14 wherein the mixture in the drum is abrasive, causing removal of any oxide coating from the surface of said free bodies and causing the surfaces of said free bodies to remain oxide free in order for the free bodies to become and remain oleophilic and coated with dispersed oil phase particles.

17. The method as set forth in claim 7 wherein one or more emulsion breaking chemicals are added to said mixture to remove from said dispersed oil phase particles any repulsive forces that would prevent attachment of dispersed phase to the oleophilic surfaces of said free bodies.

18. The method as set forth in claim 17 wherein said chemical is an inorganic alkaline earth salt or hydroxide.

19. The method as set forth in claim 7 wherein said mixture is produced from an oil well.

20. The method as set forth in claim 7 wherein said mixture is derived from a hot water oil sands extraction plant.

21. The method as set forth in claim 7 wherein said mixture is an aqueous oil sand slurry from which debris, rocks and/or oversize lumps have been removed.

22. The method as set forth in claim 7 wherein said mixture is an oil-in-water emulsion produced by enhanced oil well recovery methods to recover bitumen from a buried tar sands or heavy oil deposit.

23. A method for increasing the mean particle size of dispersed aqueous phase particles in a liquid mixture of continuous oil phase and dispersed aqueous phase which comprises the steps of:
   a. introducing said mixture into a generally enclosed horizontal rotating drum that contains retained free bodies at least a portion of said free bodies having at least one hydrophilic surface that has affinity for aqueous phase.
   b. agitating said mixture in the rotating drum so that said free bodies continually mix with said mixture such that the hydrophilic surface of said free bodies come in contact with said dispersed aqueous phase particles causing said dispersed aqueous phase particles to temporarily adhere to the hydrophilic surface of said free bodies and unite to form enlarged aqueous phase particles until such enlarged aqueous phase particles become sufficiently large that they are redispersed into said mixture from the hydrophilic surface of said free bodies as enlarged dispersed aqueous phase particles by the physical forces operating within said rotating drum as a result of said agitation, and
   c. removing said mixture containing said enlarged dispersed aqueous phase particles from said drum containing said retained free bodies for subsequent separation of dispersed aqueous phase particles from the continuous oil phase.

24. The method as set forth in claim 23 wherein the continuous phase has a viscosity within the range 0.01 to 500 poises.

25. A method as set forth in claim 23 wherein said drum also contains free bodies with oleophilic surfaces or with at least one oleophilic surface.

26. A method as set forth in claim 23 wherein at least part of the internal surfaces of said drum are hydrophilic.

27. The method as set forth in claim 23 wherein one or more emulsion breaking chemicals are added to said mixture to remove from said aqueous phase particles any repulsive forces that would prevent attachment of dispersed aqueous phase to the hydrophilic surfaces of said free bodies.

28. The method as set forth in claim 23 wherein a hydrophilic surface active agent is added to the mixture to encourage particulate solids to collect into the aqueous dispersed phase instead of the oil phase.

29. The method as set forth in claim 23 wherein a chelating agent is added to the mixture for the purpose of transferring particulate solids from the continuous oil phase to the dispersed aqueous phase.

30. The method as set forth in claim 23 wherein said mixture is a bituminous froth containing entrapped gas bubbles wherein said gas bubbles collapse during said agitation in said drum thereby enhancing subsequent separation of water and particulate solids from said froth.

31. The method as set forth in claim 23 wherein said continuous phase consists of bitumen that contains water droplets and particulate solids.

32. The method as set forth in claim 23 wherein said continuous phase consists of heavy petroleum oil.

33. An apparatus for increasing the size of dispersed phase particles in a feed mixture of dispersed phase and continuous phase, comprising:
   a. a generally enclosed horizontal rotating drum provided with a feed inlet and a product outlet, said drum being partly filled with retained mechanical free bodies that have an affinity for dispersed phase drum feed contents,
   b. drum mounting means and rotating means supporting said drum so as to rotate the drum as a tumbler at a predetermined rate of speed,
   c. means that permits introduction of feed to the rotating drum such that drum contents will not spill out the drum at the feed inlet, and
   d. means that permit exit of product mixture from the drum at a rate that maintains a desired mixture through the drum but that prevents the retained free bodies from leaving the drum.

34. Apparatus according to claim 33 which includes longitudinal ribs along the drum internal periphery to prevent drum contents from sliding along drum wall and to cause the mixture to tumble inside said drum.

35. Apparatus according to claim 33 wherein at least a portion of the free bodies contain at least one oleophilic surface.

36. Apparatus according to claim 33 wherein at least a portion of the free bodies contain at least one hydrophilic surface.

37. Apparatus according to claim 33 wherein the free bodies contain both oleophilic and hydrophilic surfaces.

38. Apparatus according to claim 33 wherein at least a portion of the internal drum surfaces is oleophilic.

39. Apparatus according to claim 33 wherein at least a portion of the internal drum surfaces is hydrophilic.

40. Apparatus according to claim 33 wherein the products outlet is positioned in the drum such that under steady state conditions the composition of the drum contents is caused to be different from the composition of the feed and products streams.

41. Apparatus according to claim 33 wherein the product mixture exits through perforations in the cylindrical wall of said drum.

42. Apparatus according to claim 41 wherein said drum is partly immersed in a tank or cover and drum contents, after passing through said perforations, leave said tank or cover to the separator.

43. Apparatus according to claim 42 wherein paddles on said drum prevent settling of solids in said tank or cover.

44. Apparatus according to claim 33 wherein the products outlet is positioned in an end wall of the drum.

45. Apparatus according to claim 41 wherein the products outlet is an annular ring.

46. Apparatus according to claim 41 wherein the products outlet is a circular opening at the center of the end wall.

47. Apparatus according to claim 41 wherein the products outlet size is determined by an adjustable sliding gate.

48. A method for increasing the mean particle size of aqueous particles dispersed in an oil phase which comprises tumbling a mixture of oil phase having dispersed aqueous particles in the presence of some free bodies having at least one hydrophilic surface for a time sufficient to allow said aqueous particles to come into contact with said bodies and unite into larger particles.

49. A method for increasing the mean particle size of oil particles dispersed in an aqueous phase which comprises tumbling a mixture of aqueous phase having dispersed oil particles in the presence of some free bodies having at least one oleophilic surface for a time sufficient to allow said oil particles to come into contact with said free bodies and unite into larger particles.

* * * * *